United States Patent [19]
Grant et al.

[11] Patent Number: 5,207,512
[45] Date of Patent: May 4, 1993

[54] SPHERICAL ROLLER BEARING ASSEMBLY

[75] Inventors: Jerome D. Grant; Wayne M. Svegal, both of Brooklyn Park; James J. McClurg, Vadnais Heights, all of Minn.

[73] Assignee: Dresser-Rand Company, Corning, N.Y.

[21] Appl. No.: 880,150

[22] Filed: May 6, 1992

[51] Int. Cl.⁵ ............................................. F16C 19/38
[52] U.S. Cl. ................................. 384/464; 384/476; 384/906
[58] Field of Search ............... 384/464, 476, 473, 571, 384/568, 906, 584

[56] References Cited

U.S. PATENT DOCUMENTS

| | | | |
|---|---|---|---|
| 3,934,957 | 1/1976 | Derner | 384/568 |
| 3,957,319 | 5/1976 | Gorski | 384/568 |
| 4,997,293 | 3/1991 | Ono et al. | 384/476 |
| 5,069,559 | 12/1991 | Muller et al. | 384/476 |

Primary Examiner—Lenard A. Footland
Attorney, Agent, or Firm—Bernard J. Murphy

[57] ABSTRACT

A spherical roller bearing is confined in a bearing ring which, in turn, is confined in a bearing housing, the housing and the ring each being of split construction. The housing has a pair of il reservoirs therein separated by a saddle upon which the ring is mounted, and an anti-rotation pin engages both the housing and the ring to prohibit rotation of the latter in the former. The ring, too, has an oil reservoir therewithin. The ring and pin, and accordingly the bearing, are electrically isolated from the housing. An oil ring rides upon a bearing-mounted motor shaft through slots formed in the bearing ring, and is guided by machined reliefs formed in opposite sides of the bearing ring. Holes in the saddle provide for a through-flow of oil between the pair of reservoirs in the housing.

16 Claims, 2 Drawing Sheets

SPHERICAL ROLLER BEARING ASSEMBLY

This invention retains to bearing assemblies, and in particular to ring-oiled bearing assemblies.

Ring-oiled bearing assemblies are well known in the prior art, and exemplary thereof are U.S. Pat. No. 54,533,264, issued to Werner Haugwitz, on Aug. 6, 1985, for a Housing for Roller Bearings with Lubricating Means, and U.S. Pat. No. 4,619,535, issued on Oct. 28, 1986, to the aforesaid Werner Haugwitz, for a Bearing Housing, both thereof having to do with pillow block designs.

The aforesaid patented devices are quite suitable, for the objects thereof, but there obtained a need for a bearing assembly for use on the drive, or non-drive end of brush or brushless electrical motors or generators which (a) could electrically isolate the bearing and (b) accommodate bracket mounting to the motor (or generator) frame.

It is an object of this invention to set forth the needed bearing assembly.

Particularly, it is an object of this invention to disclose a spherical roller bearing assembly comprising a split bearing housing; and a split bearing ring; wherein said ring is confined within said housing; said housing has a saddle for supporting aid ring thereupon; and further including a pin, engaged with both said housing and said ring, for inhibiting rotation of said ring within said housing; means interposed between said housing and said ring for electrically isolating said ring from said housing; and a spherical roller bearing confined within said ring.

Further objects of this invention, as well as the novel features thereof, will become apparent by reference to the following description taken in conjunction with the accompanying figures, in which:

BRIEF DESCRIPTION OF THE DRAWINGS

As shown in FIG. 1, the motor 10 has a stator 12, and a rotor 14 with a shaft extension 16 at the drive end 18 which is supported in a split sleeve bearing 20. The motor 10 has a blower 22, and a brushless exciter 24 at the non-drive end 26. The free arrows denote air flow into the motor 10. The novel spherical roller bearing assembly 28, according to an embodiment of the invention, is shown mounted to a bracket 30 of the motor 10.

Figure 2:
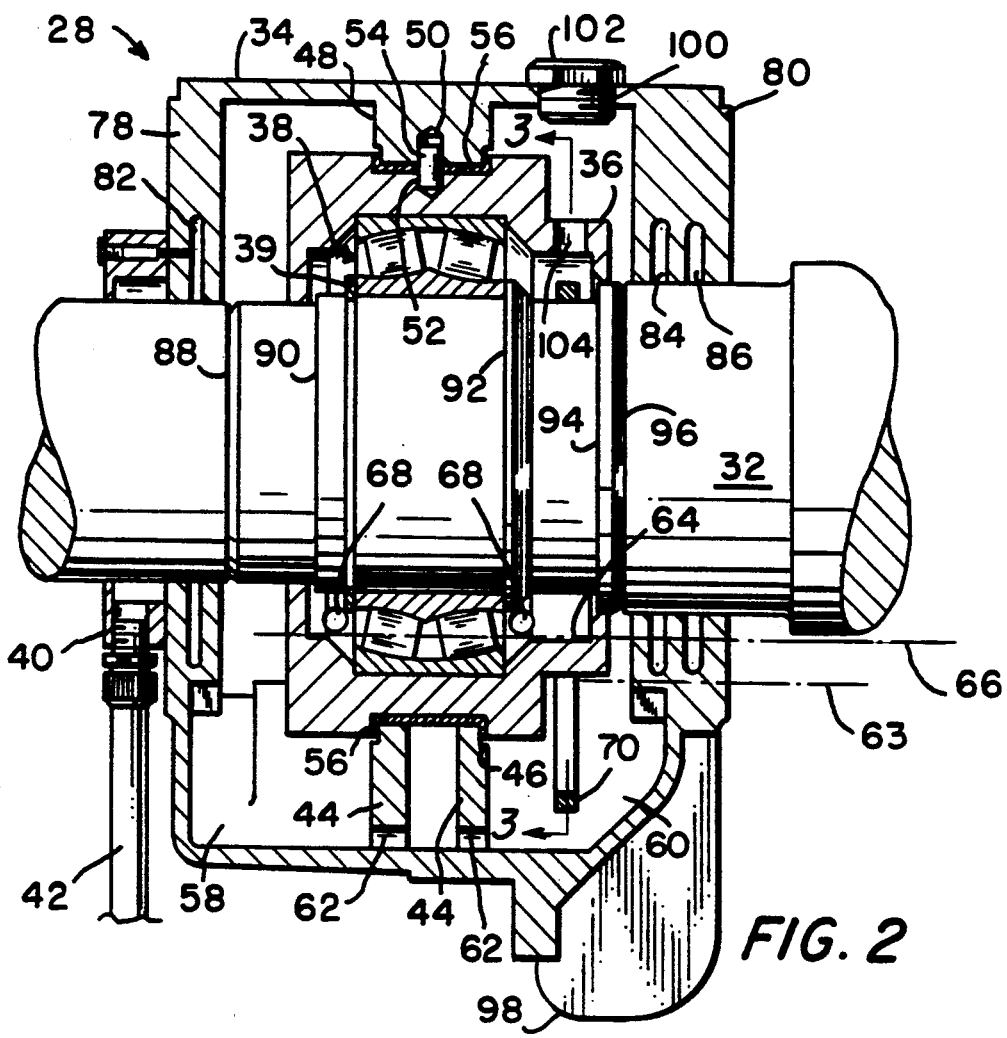
FIG. 2 is an enlarged, cross-sectional view of the bearing assembly of the aforesaid FIG. 1.
Figure 3:
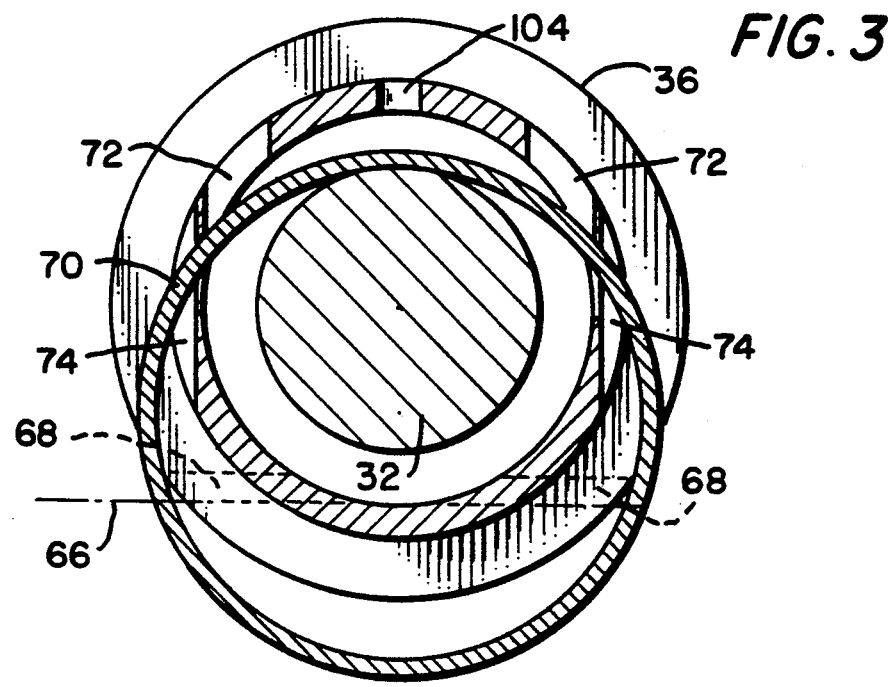
FIG. 3 is a cross-sectional view taken along section 3—3 of FIG. 2.

As a shown in FIGS. 2 and 3, the bearing assembly 28 is mounted on the motor shaft 32. It has a horizontally split bearing housing 34 in which is confined a horizontally split bearing ring 36. The spherical roller bearing 38 is housed within the bearing ring 36. A snap ring 39 is set within a groove provided therefor in the shaft 32, and on the "outboard" side, i.e., at the left of FIG. 2, is a shaft seal 40. A conduit 42 is coupled to the seal 40 for atmospheric venting or pressurization.

At the bottom, the bearing housing 34 has a semi-circular saddle 44 extending inwardly therefrom which engages an annular recess 46 formed in the outermost surface of the bearing ring 36. Additionally, the bearing housing 34 also has an inwardly-directed, semi-circular prominence 48 which, also, is engaged with the recess 46. The recess 46 and the prominence 48 have coaxial, blind-end holes 50 and 52 which receive an insulated pin 54. The pin 54 inhibits a rotation of the bearing ring 36 within the bearing housing 34.

The invention provides for electrically isolating the bearing 38 from ground. This is through the interposition of insulation 56 between the saddle 44 and the recess 46, and between the prominence 48 and the recess 46.

The bearing housing 34 has an "outboard" oil reservoir 58 and an "inboard" oil reservoir 60, the two being separated therebetween by the saddle 44. However, the saddle 44 has reservoir-connecting holes 62 formed therein to accommodate oil flow therebetween. An oil level 63 is maintained in the reservoirs 58 and 60. The bearing ring 36, too, has an oil reservoir 64 therewithin, for lubricating the rollers of the bearing 38. The bearing 38 has bottom rollers with a pitch diameter which coincides with a plane 66. The plane 66 defines the uppermost level of the reservoir 64. Drain ports 68 (of which there are four), opening both internally and externally of the bearing ring 36, lie along the plane 66 to maintain the reservoir 64 oil at the plane 66 level.

An oil ring 70 rides upon the shaft 32, and is captured by, or engaged with slots 72 formed therefor on opposite sides of the bearing ring 36. In addition, the walls of the slots 72 have reliefs 74 machined therein in which the oil ring 70 is guided.

The bearing housing 34 comprises parallel walls 78 and 80, and each of the walls have annular chambers 82 and 84 formed therein which provide for an equalization of the pressures in the air/oil vapor above the reservoirs 58 and 60. In addition, wall 80 has an annular channel 86 formed therein, in proximate adjacency to the outer surface of wall 80, for communicate of the interior of the housing 34 with the ambient atmosphere.

In operation, as the shaft 32 commences to rotate, the oil ring 70 is driven by dry friction obtaining between the shaft and the ring. In rotation, the ring 70 is surely guided by the reliefs 74 in the bearing ring 36. Soon, the oil carried up by the ring 70 forms a film between the ring 70 and the shaft 32, and this causes the oil ring 70 to experience slippage and a slowing of its rotation. The speed of rotation of the ring 70 determines the oil flow rate, and is dependent upon the geometry of the ring 70 and the shaft 32, the depth of the immersion of the ring 70 in the reservoir 60, and the temperature and viscosity of the oil in the latter reservoir.

Figure 1:
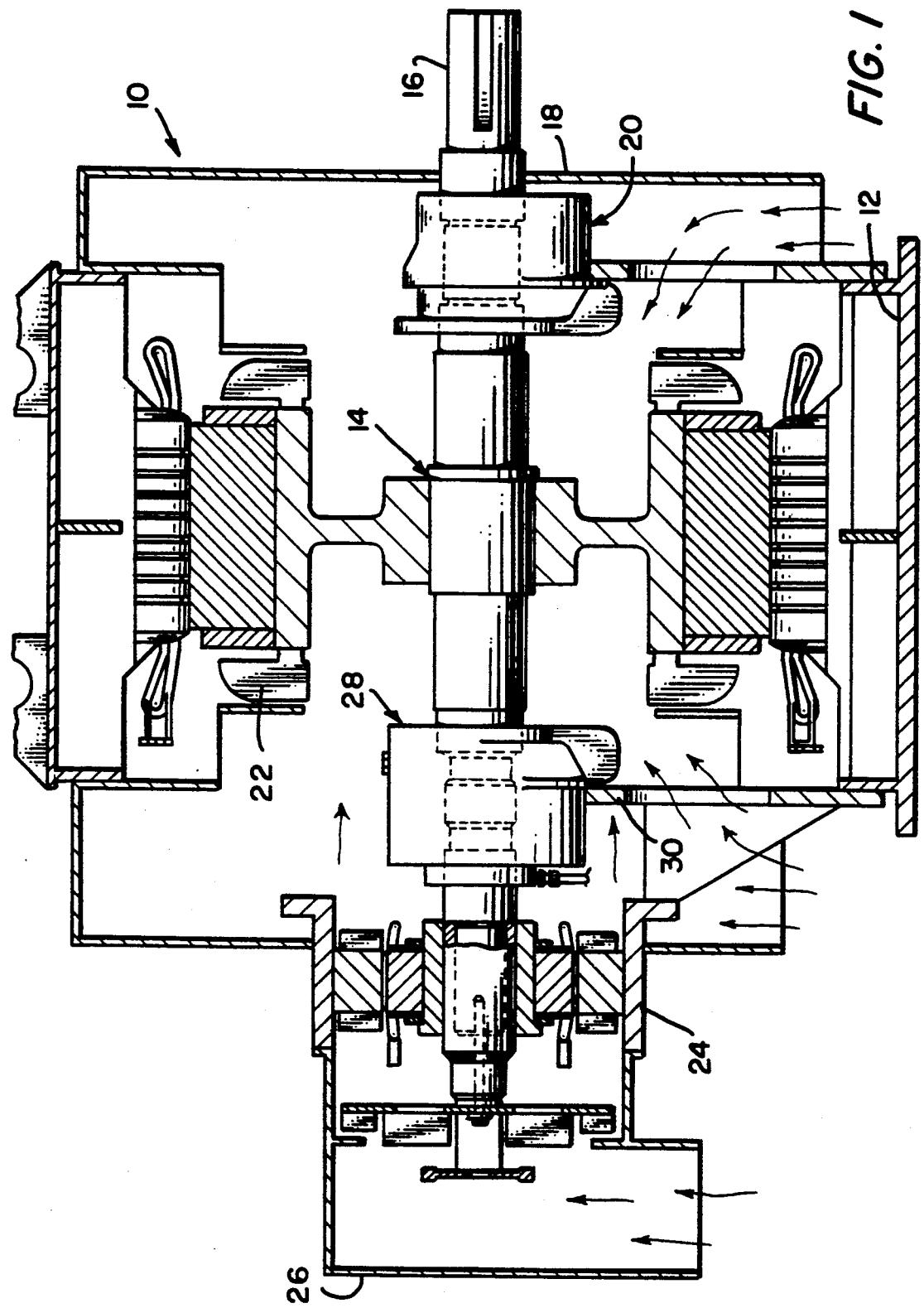
FIG. 1 is a cross-sectional view of a brushless electrical motor which shows the novel spherical roller bearing assembly, according to an embodiment thereof, mounted to the non-drive end of the motor shaft.

The majority of the supply of oil to the bearing 38 proceeds from centrifugal force acting on the diverging oil film located at the point where the oil ring 70 inner diameter leaves the film due to the aforesaid geometry between the oil ring 70 and the shaft 32. A small amount of oil migrates axially along the shaft 32 until it builds a thick enough film and/or reaches shaft oil slingers 88, 90, 92, 94 and 96. Slingers 88, 90 and 96 inhibit a migration of oil along the shaft. At slingers 92 and 94, centrifugal force overcomes the oil cohesion and throws a small amount of oil therefrom. Most of the centrifugally thrown oil collects in the bearing ring reservoir 64. The drain ports 68, as noted earlier, maintain the oil level at the plane 66. Additionally, the "inboard" ports 68 bleed off an excess oil delivered by the oil ring 70. Oil flows through the bearing 38 from "inboard" to "outboard". Direct mixing of the supply oil with the oil which passes through the bearing 38 (i.e., hot oil) is prevented by the saddle 44. The hot oil is mostly cooled by heat conduction toward walls 78 and 80. In turn, the walls 78 and 80 are cooled by convection from a combination of the inlet of the motor 10 and exhaust air from the exciter 24. Oil is coolest at the bottom of the reservoir 58. Meanwhile, in the reservoir 60, oil is constantly being extracted by the oil ring 70. This creates a small pressure difference which forces the relatively cooler oil in the reservoir 58 to flow into the adjacent reservoir 60, via the holes 62. The bearing housing 34 has cooling fins 98 extending therefrom (only one shown); consequently, before being taken up again by the oil ring 70, the oil in reservoir 60 is further cooled by the air flow induced by the blower 22 (FIG. 1), passing over the fins 98. A feature of our invention accommodates for a visual inspection of the oil ring 70, in order to ascertain its functioning. In this, an aperture 100 formed through the top of the bearing housing 34 has a viewing window 102 fixed therein. The latter aligns with an aperture 104 formed in the bearing ring 36, and the aperture 104 is directly above the oil ring 70.

While we have described our invention in connection with a specific embodiment thereof, it is to be clearly understood that this is done only by way of example, and not as a limitation to the scope of our invention as set forth in the objects thereof, and in the appended claims.

We claim:

1. A spherical roller bearing assembly, comprising:
a split bearing housing; and
a split bearing ring; wherein
said ring is confined within said housing;
said housing has a saddle for supporting said ring thereupon; and further including
a pin, engaged with both said housing and said ring, for inhibiting rotation of said ring within said housing;
means interposed between said housing and said ring for electrically isolating said ring from said housing; and
a spherical roller bearing confined within said ring.

2. An assembly, according to claim 1, wherein:
said housing has a plurality of fluid reservoirs formed therewithin; and
said saddle has means formed therewithin for effecting fluid flow between said reservoirs of said plurality thereof.

3. An assembly, according to claim 2, wherein:
said housing has a pair of parallel walls; and
said walls have means formed therewithin for equalizing pressures of air/oil vapor above said reservoirs of said plurality thereof.

4. An assembly, according to claim 1, wherein:
said pin is electrically insulated; and
said isolating means comprises insulation interposed between said saddle and said ring.

5. An assembly, according to claim 1, wherein:
said ring has an annular recess formed in the outermost surface thereof;
said saddle is engaged with said recess;
said housing has an inwardly-directed prominence;
said prominence is engaged with said recess;
said prominence and said recess have coaxial, blind-end holes formed therein; and
said pin is set in said holes.

6. An assembly, according to claim 5, wherein:
said isolating means comprises insulation interposed between said recess and said prominence.

7. An assembly, according to claim 1, wherein:
said bearing has a bottom roller with a given pitch diameter;
said ring has a fluid reservoir formed therewithin having (a) a given depth, and (b) an uppermost level; and
said level in in a plane which coincides with said pitch diameter.

8. An assembly, according to claim 7, wherein:
said ring has fluid drainports formed therein which open both internally and externally of said ring, and lie along said plane.

9. An assembly, according to claim 1, further including:
an oil ring; wherein
said bearing ring has slots formed in opposite sides thereof; and
said oil ring is in traverse of said slots.

10. An assembly, according to claim 9, wherein:
said bearing ring has means formed on an outer surface thereof for guiding said oil ring in rotation.

11. An assembly, according to claim 10, wherein:
said guiding means comprises machined reliefs formed in said outer surface.

12. An assembly, according to claim 9, wherein:
said housing and said bearing ring have means cooperative for accommodating visual observation of an interior of aid bearing ring.

13. An assembly, according to claim 12, wherein:
said visual observation accommodating means comprise coaxially aligned apertures formed in said housing and said bearing ring.

14. An assembly, according to claim 13, wherein:
said apertures visually expose said oil ring.

15. An assembly, according to claim 1, wherein:
said housing has means formed therewithin for communicating an interior of said housing with the ambient atmosphere.

16. An assembly, according to claim 15, wherein:
said communicating means comprises an annular channel formed in said housing in proximate adjacency to an outermost surface thereof.

* * * * *